(12) United States Patent
Meyer

(10) Patent No.: US 7,865,144 B2
(45) Date of Patent: Jan. 4, 2011

(54) DETERMINATION OF CARRIER AND SYMBOL FREQUENCIES IN A SIGNAL

(75) Inventor: Jacques Meyer, Saint Martin le Vinoux (FR)

(73) Assignee: STMicroelectronics S.A., Montrouge (FR)

( * ) Notice: Subject to any disclaimer, the term of this patent is extended or adjusted under 35 U.S.C. 154(b) by 988 days.

(21) Appl. No.: 11/213,390

(22) Filed: Aug. 26, 2005

(65) Prior Publication Data

US 2006/0044477 A1    Mar. 2, 2006

(30) Foreign Application Priority Data

Aug. 26, 2004  (FR) ................... 04 51910

(51) Int. Cl.
*H04B 17/00* (2006.01)
*H04N 5/44* (2006.01)
*H04L 27/00* (2006.01)

(52) U.S. Cl. .............. 455/67.11; 348/725; 375/324

(58) Field of Classification Search .......... 455/67.11; 348/725; 375/324
See application file for complete search history.

(56) References Cited

U.S. PATENT DOCUMENTS

| | | | | |
|---|---|---|---|---|
| 4,862,098 A | * | 8/1989 | Yassa et al. ................ 329/358 |
| 5,162,723 A | * | 11/1992 | Marzalek et al. ......... 324/76.19 |
| 5,481,218 A | * | 1/1996 | Nordholt et al. ............ 327/350 |
| 5,563,537 A | | 10/1996 | Seta | |
| 5,706,057 A | * | 1/1998 | Strolle et al. ........... 375/240.01 |
| 5,852,381 A | * | 12/1998 | Wilmot et al. .............. 327/440 |
| 5,892,799 A | * | 4/1999 | Jaakkola ..................... 375/340 |
| 5,920,506 A | * | 7/1999 | Wang et al. ............. 365/185.18 |
| 6,281,507 B1 | * | 8/2001 | Ghelmansarai ........ 250/370.09 |
| 6,333,767 B1 | * | 12/2001 | Patel et al. .................... 348/725 |
| 6,353,636 B1 | * | 3/2002 | Tate et al. ................... 375/260 |
| 6,356,608 B1 | * | 3/2002 | Atarius ....................... 375/362 |
| 6,539,068 B2 | * | 3/2003 | Hebron et al. ............. 375/346 |
| 6,671,339 B1 | * | 12/2003 | Ahn ............................ 375/346 |
| 6,704,374 B1 | * | 3/2004 | Belotserkovsky et al. ... 375/326 |
| 6,839,388 B2 | * | 1/2005 | Vaidyanathan ............. 375/326 |
| 6,842,495 B1 | * | 1/2005 | Jaffe et al. ................... 375/326 |
| 6,892,075 B2 | * | 5/2005 | Ojard et al. ................. 455/504 |
| 6,968,170 B2 | * | 11/2005 | Talbot ...................... 455/278.1 |
| 6,996,156 B1 | * | 2/2006 | Ono ............................ 375/147 |
| 7,133,644 B2 | * | 11/2006 | Demir et al. .............. 455/67.11 |

(Continued)

FOREIGN PATENT DOCUMENTS

EP    773655 A2 *   5/1997

OTHER PUBLICATIONS

French Search Report from corresponding French Application 0451910, filed Aug. 26, 2004.

*Primary Examiner*—Duc Nguyen
*Assistant Examiner*—Ayodeji Ayotunde
(74) *Attorney, Agent, or Firm*—Lisa K. Jorgenson; William R. McClellan; Wolf, Greenfield & Sacks, P.C.

(57) ABSTRACT

A method and a device for determining, in a signal, a value of the frequency of a carrier and a value of the frequency of symbols carried by the carrier. A band of the signal is analyzed at three points and the relations between the powers at these points enable determining values of the carrier frequency and of the symbol frequency.

18 Claims, 3 Drawing Sheets

U.S. PATENT DOCUMENTS

| | | | |
|---|---|---|---|
| 7,136,432 B2* | 11/2006 | Min et al. | 375/326 |
| 7,203,457 B1* | 4/2007 | Wetzel | 455/3.02 |
| 7,206,557 B2* | 4/2007 | Aytur et al. | 455/118 |
| 7,245,650 B2* | 7/2007 | Kuroyanagi et al. | 375/141 |
| 7,376,200 B2* | 5/2008 | Demir et al. | 375/296 |
| 7,395,548 B2* | 7/2008 | Runzo | 725/107 |
| 7,420,503 B2* | 9/2008 | Uchino | 342/70 |
| 2001/0024479 A1* | 9/2001 | Samarasooriya | 375/326 |
| 2003/0022645 A1* | 1/2003 | Runzo | 455/226.2 |
| 2004/0017843 A1* | 1/2004 | Fitton et al. | 375/148 |
| 2004/0018822 A1* | 1/2004 | Ojard et al. | 455/295 |
| 2004/0028121 A1* | 2/2004 | Fitton | 375/144 |
| 2004/0028160 A1 | 2/2004 | Bienek et al. | |
| 2004/0121741 A1* | 6/2004 | Rashev et al. | 455/114.3 |
| 2004/0132424 A1* | 7/2004 | Aytur et al. | 455/335 |
| 2004/0248516 A1* | 12/2004 | Demir et al. | 455/63.1 |
| 2004/0252782 A1* | 12/2004 | Demir et al. | 375/296 |
| 2004/0264594 A1* | 12/2004 | Kasai et al. | 375/296 |
| 2005/0069050 A1* | 3/2005 | Ding et al. | 375/296 |
| 2005/0233746 A1* | 10/2005 | Laroia et al. | 455/436 |
| 2006/0062324 A1* | 3/2006 | Naito et al. | 375/296 |
| 2006/0208820 A1* | 9/2006 | Parsa et al. | 332/103 |
| 2006/0291589 A1* | 12/2006 | Eliezer et al. | 375/302 |
| 2007/0057718 A1* | 3/2007 | Coulson | 327/551 |
| 2008/0063113 A1* | 3/2008 | Gao et al. | 375/296 |

* cited by examiner

DETERMINATION OF CARRIER AND SYMBOL FREQUENCIES IN A SIGNAL

BACKGROUND OF THE INVENTION

1. Field of the Invention

The present invention generally relates to modulation systems where data are carried in the form of symbols by carriers.

2. Discussion of the Related Art

FIG. 1 shows a band 1 of the spectrum of a signal conventionally modulated by a modulation of QAM, BPSK, QPSK, MPSK, etc. type. Band 1 is centered on a frequency Fo corresponding to the carrier frequency. The total width of the band, B, extending on either side of central frequency Fo, substantially corresponds to the symbol frequency.

A signal received, for example, by a satellite receiver, exhibits many bands or channels of the type of band 1. Each band is associated with a specific symbol frequency, or with two frequencies if the carriers are in quadrature, and each carrier or pair of carriers is associated with a specific symbol frequency.

For the processing of this type of signal, it is necessary to precisely know the values of the carrier frequencies and of the symbol frequency.

A problem is posed, since the carrier frequencies and the symbol frequency are not always known by the receiver.

Determining these frequencies is difficult since it is a research on two parameters, which may vary within large proportions. For example, in a signal originating from a satellite receiver antenna, the carriers (or channels) are distributed over a range that can vary from approximately 1 to 2 GHz and, for each channel, the symbol frequency may for example range between 1 and some thirty or some forty Megabauds.

A conventional method to determine the carrier frequencies and those of the symbols consists of arbitrarily setting a symbol frequency, for example, 20 Mbauds, and of then scanning the entire spectrum for the carrier frequencies. After this, the symbol frequency is slightly modified, for example, it is changed to 20.1 Mbauds, and the spectrum scanning is started over again. This method is very long, even if, by a previous scanning, the general shape of the signal spectrum has been roughly determined.

SUMMARY OF THE INVENTION

An object of the present invention is to enable fast determination of the carrier frequency and of the symbol frequency for each channel of a signal.

To achieve this object, as well as others, the present invention provides a method for determining, in a signal, a value of the frequency of a carrier and a value of the frequency of symbols carried by said carrier, comprising the steps of:

a) determining a characteristic of the signal at or around a plurality of points of a band of the signal spectrum, each point corresponding to a specific frequency of the signal;

b) displacing said points so that the characteristics at said points exhibit specific relations; and c) determining the value of the carrier and the value of the frequency of the symbols from the frequencies corresponding to said points.

According to an embodiment of the present invention, the method for determining, in a signal, a value of the frequency of a carrier and a value of the frequency of symbols carried by said carrier comprises the steps of:

a) determining a characteristic of the signal at or around a first, a second, and a third point of a band of the signal spectrum, the first point corresponding to a first frequency, the second point corresponding to a second frequency lower than the first frequency, and the third point corresponding to a third frequency greater than the first frequency;

b) displacing the first, second, and third points so that said characteristic of the signal at the second point is equal to said characteristic of the signal at the third point and that the quotient of the sum of said characteristics of the signal at the second and third points and of said characteristic of the signal at the first point is equal to a determined ratio; and c) selecting, as a value of the carrier, the first frequency and, as a value of the symbol frequency, the difference between the third and the second frequency.

According to an embodiment of the present invention, said characteristic is the signal power.

According to an embodiment of the present invention, the difference between the first frequency and the second frequency is equal to the difference between the third frequency and the first frequency.

According to an embodiment of the present invention, the method comprises the steps of:

5a) determining powers Pm, Pl, Pr of the signal in areas around the first, second, and third frequencies;

5b) if Pr is greater than Pl, increasing the first frequency by a predetermined quantity; and/or 5c) if ratio (Pr+Pl)/Pm is greater than a determined ratio, increasing the difference between the third and the second frequency.

According to an embodiment of the present invention, the difference between the third and the first frequency is selected to be initially equal to half the smallest possible frequency for the symbols.

According to an embodiment of the present invention, the determination of the signal characteristic is performed by calculating an average over several samples.

The present invention also provides a device intended to determine, in a signal, a value of the frequency of a carrier and a value of the frequency of symbols carried by said carrier, comprising:

a) first frequency-changing means for transposing a first frequency of the signal to zero;

b) second frequency-changing means for transposing a second frequency of the signal to zero;

c) third frequency-changing means for transposing a third frequency of the signal to zero;

d) filtering means capable of receiving the signals originating from the first, second, and third frequency-changing means for providing a portion of the signal spectrum centered around the first, second, and third frequencies;

e) calculation means for calculating the power of the signals originating from the filtering means; and f) control means capable of controlling the frequency-changing means from the powers provided by the calculation means.

According to an embodiment of the present invention, the control means comprise:

a) determination means for determining relations $Kc \cdot (Pl-Pr)$ and $Kt \cdot (Pl+Pr-\alpha*Pm)$, Pm, Pl, Pr being the powers respectively corresponding to the first, second, and third frequencies, Kc and Kt being parameters, and $\alpha*$ a determined coefficient; and b) incrementation-decrementation means for modifying the frequencies transposed by the frequency-changing means according to the result provided by the determination means.

According to an embodiment of the present invention, the first frequency-changing means is a derotator and the second and third frequency-changing means are derotators coupled with the first derotator.

According to an embodiment of the present invention, the device further comprises a variable-rate filter coupled between the output of the first derotator and the input of the second and third derotators.

The foregoing object, features, and advantages of the present invention, as well as others, will be discussed in detail in the following non-limiting description of specific embodiments in connection with the accompanying drawings.

DETAILED DESCRIPTION

Figure 1:
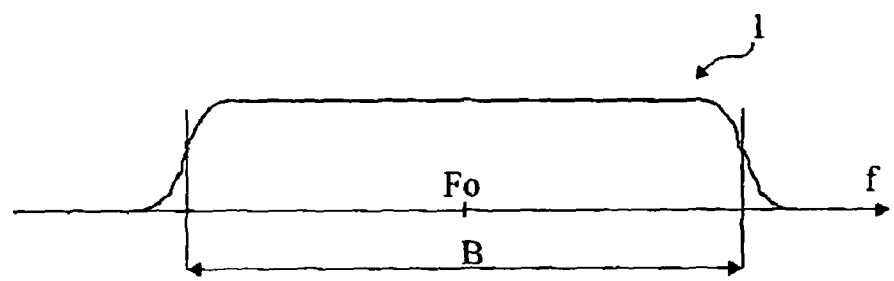
FIG. 1 illustrates the frequency band used by a channel of a received signal.

For clarity, the same elements have been, unless otherwise mentioned, designated with the same reference numerals in the different drawings and, further, the various drawings are not to scale.

Figure 2:
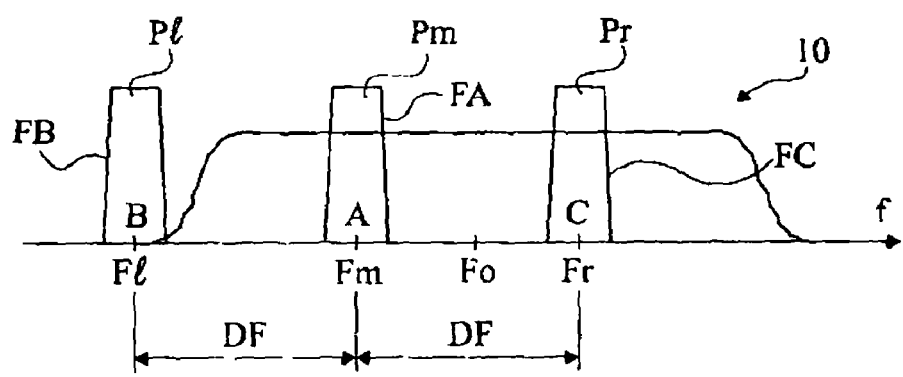
FIGS. 2, 3, and 4 illustrate the method according to the present invention.

In FIG. 2, according to the present invention, a band 10, of central frequency Fo, corresponding to a channel, is analyzed at three points A, B, and C. Points A, B, and C respectively correspond to frequencies Fm, Fl, and Fr. Frequency Fl is smaller than frequency Fm and frequency Fr is greater than frequency Fm. Difference DF between frequencies Fm and Fl is equal to the difference between frequencies Fr and Fm.

The signal power is determined at points A, B, and C. For this purpose, narrow-band filters FA, FB, FC sample a portion of the signal around frequencies Fm, Fl, and Fr, and calculation units determine the signal power at the output of these filters. Note Pm the power corresponding to frequency Fm, Pr the power corresponding to frequency Fr, and Pl the power corresponding to frequency Fl.

According to the present invention, powers Pr and Pl are compared, on the one hand, and ratio $\alpha=(Pl+Pr)/Pm$ is examined, on the other hand. If Pr is different from Pl, and $\alpha$ is different from a determined value $\alpha^*$, points A, B, and C are shifted until Pr=Pl and $\alpha=\alpha^*$.

In FIG. 2, Pr is substantially equal to Pm and Pl is substantially zero. Nodes A, B, C will altogether be shifted to the right, towards increasing frequencies. New determinations of Pm, Pr, and Pl will now be performed, and points A, B, C will be moved again, together or separately, until Pr=Pl and $\alpha=\alpha^*$.

Figure 3:
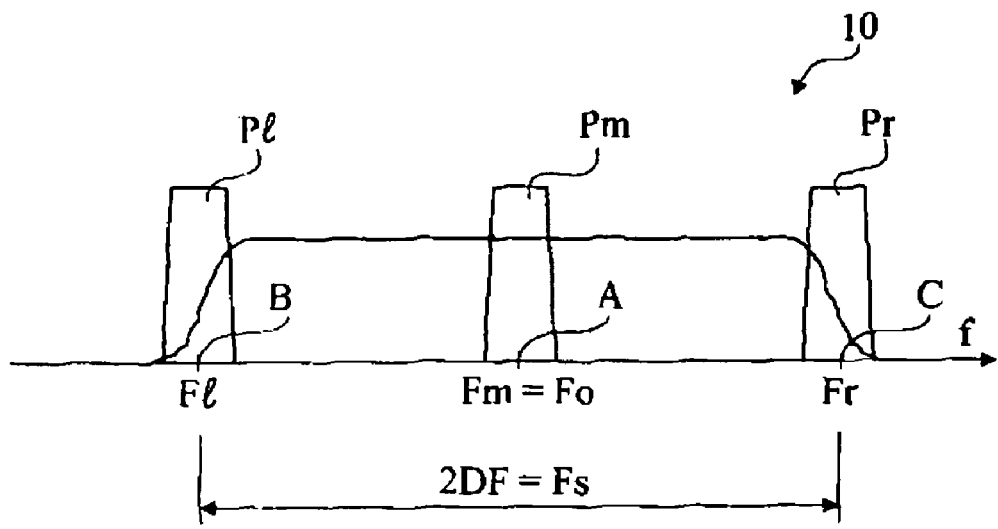

FIG. 3 illustrates what will be called the state of equilibrium in which Pr=Pl and $\alpha=\alpha^*$. $\alpha^*$ is selected so that point C corresponds to the end of band 10 and point B corresponds to the beginning of band 10. Further, ratio $\alpha^*$ is selected so that, at equilibrium, the difference between frequencies Fr and Fl, equal to 2DF, is substantially equal to symbol frequency Fs. Further, since Pl=Pr, point A is substantially located in the middle of the band. Frequency Fm is thus substantially equal to the central frequency of band Fo, which corresponds to the carrier frequency.

According to the present invention, once equilibrium has been obtained, frequency Fm is selected as frequency Fo of the carrier and the difference between frequencies Fr and Fl is selected as symbol frequency Fs.

The values of Fo and Fs, thus very rapidly obtained, are generally approximate values. However, they are sufficiently accurate to enable efficiently applying algorithms providing very accurate values of Fo and Fs. It should be noted that these algorithms, if they were used directly, and not based on the values provided by the present invention, would take a huge amount of time to converge or would probably not converge at all or would provide erroneous values.

Of course, the configuration of FIG. 2 is an example only and, during or at the beginning of the method, the configuration of points A, B, and C may be of any type.

Figure 4:
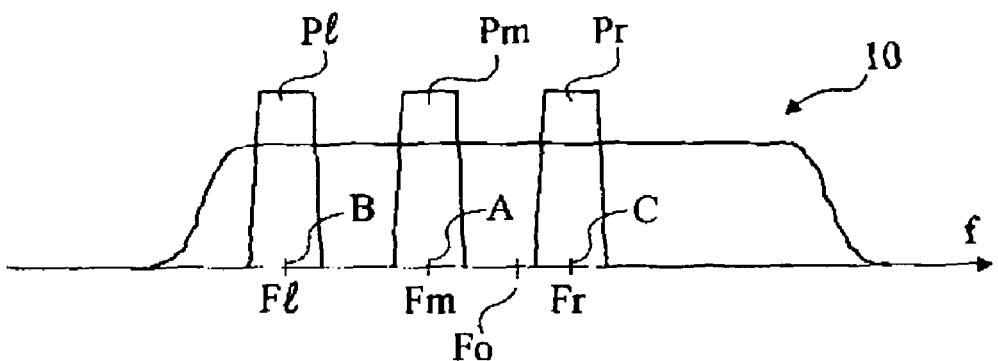

In FIG. 4, for example, points A, B, C are very close and powers Pl, Pm, and Pr are equal. In this case, Pl=Pr but $\alpha$, substantially equal to 2, is much greater than $\alpha^*$. In this case, preferably, point A will not be displaced, but points B and C will be displaced so that interval DF is greater. Then, along the iterations, the case will first be close to that of FIG. 2 before obtaining the state of equilibrium of FIG. 3.

It may be preferred to be, at the beginning of the implementation of the method, in a case where points A, B, and C are very close, as in FIG. 4. For example, points A, B, and C may be selected so that the frequency interval 2·DF corresponds to the smallest possible symbol frequency of the system, 1 Mbaud, for example. The fact of selecting close starting points generally enables increasing the rapidity of the method and making its convergence secure.

Of course, the method is not limited to the example illustrated in relation with FIGS. 2 to 4.

For example, a characteristic of the signal other than the signal power, such as, for example, its amplitude, may be determined at points A, B, and C.

The difference between frequencies Fm and Fl may not be equal to the difference between frequencies Fr and Fm. It may for example be adapted to the shape of the band of the considered channel.

Also, in the method of the present invention, the signal analysis may be performed at a number of points different from three.

For example, four points may be used, by duplicating point A into two points A1 and A2, symmetrical with respect to point A. The average of the powers at A1 and A2 may then be taken as power Pm. Points B or C may also be doubled, thus taking into account specific shapes of beginning or end of the band.

Also, the value of $\alpha^*$ is not necessarily set and may, for example, be adapted to the shape of the signal band.

It should also be noted that the power calculation may be performed by an average over a number of samples, for example, a few hundreds or thousands of samples.

Two embodiments of devices according to the present invention will now be described.

Figure 5:
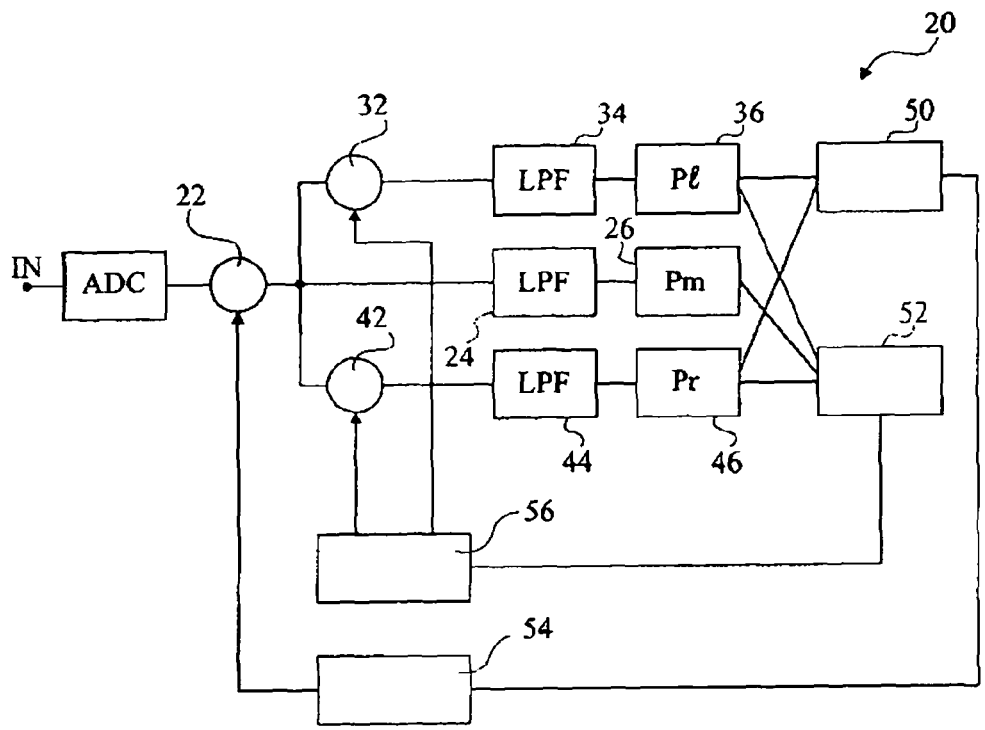
FIGS. 5 and 6 show embodiments of devices according to the present invention.

In FIG. 5, a received signal, for example, originating from a demodulator of a satellite receiver, is provided to input IN of a device 20 implementing the method according to the present invention. The signal provided to input IN is generally comprised of two components I and Q corresponding to the demodulation of carriers in phase quadrature.

The digitized signal provided by analog-to-digital ADC converter drives the input of a derotator 22. Derotator 22 performs a frequency change so that frequency Fm corresponds to zero in the signal at the demodulator output.

The output of derotator 22 drives a low-pass filter 24. Low-pass filter 24 lets through a signal portion around frequency Fm. The output of filter 24 drives a calculation unit 26 which determines power Pm of the signal provided by filter 24. Elements 22, 24, and 26 operate on components I and Q of the signal.

The output of derotator 22 also drives a derotator 32. Derotator 32 shifts in frequency the signal provided by derotator 22 so that, at the output of derotator 32, frequency Fl corresponds to zero. The output of derotator 32 drives a low-pass filter 34, which lets through a signal portion around frequency F1. The output of filter 34 drives a calculation unit 36 which determines power Pl of the signal provided by filter 34.

The output of derotator 22 further drives a derotator 42. Derotator 42 shifts in frequency the signal provided by derotator 22 so that, at the output of derotator 42, frequency Fr corresponds to zero. The output of derotator 42 drives a low-pass filter 44, which lets through a portion of the signal around frequency Fr. The output of filter 44 drives a calculation unit 46 which determines power Pr of the signal originating from filter 44.

A unit 50 receives powers Pl and Pr calculated by units 36 and 46. Unit 50 provides a signal equal to Kc·(Pl−Pr). Kc is an incrementation coefficient which has an influence upon the constant of the control performed to determine the carrier frequency.

A unit 52 receives powers Pm, Pl, and Pr provided by units 26, 36, and 46. Unit 52 provides a signal equal to Kt·(Pl+Pr−α*Pm). Kt is an incrementation coefficient which has an influence upon the constant of the control performed to determine the symbol frequency. The values of coefficients Kc and Kt are not critical. Coefficients Kc and Kt are, for example, selected to perform the controls in optimal fashion.

Unit 50 drives a unit 54 which sets the variation speed of the angle of derotator 22 to shift frequency Fm by a quantity determined by signal Kc·(Pl−Pr). For example, pulse ω of derotator 22 is incremented, respectively decremented, by quantity Kc·(Pl−Pr).

Unit 52 drives a unit 56 which sets, in the same way as for unit 54, the angles of derotators 32 and 42 to shift frequency Fm symmetrically leftwards and rightwards by a quantity determined by signal Kt·(Pl+Pr−α*Pm).

It should be noted that the attenuation contours of low-pass filters 24, 34, and 44 may further be adapted to the new frequency difference DF used.

At equilibrium, Pl−Pr=0 and Pl+Pr−α*Pm=0 and the system no longer varies. The value of Fm is then taken as the carrier frequency and the value of 2·DL=(Fr−F1) is taken as the symbol frequency. The carrier frequency and the symbol frequency may for example be respectively provided by units 54 and 56.

In practice, there may be a small oscillation at equilibrium around a final value of Fm and of DF=F1−Fr. This is not disturbing. Indeed, the control loops stabilize after a determined time interval, for example, 15 milliseconds. It is then sufficient to stop the system when this time interval has elapsed and to read the values of Fm, F1, and Fr. It may also be considered that the state of equilibrium is reached when differences Pl−Pr and Pl+Pr−α*Pm are smaller than thresholds close to zero.

As said previously, the values obtained for the carrier frequency and the symbol frequency are very rapidly obtained. These are generally approximate values. In a practical example, the carrier frequency is determined to within 1% and a specific value can then be obtained by direct control, for example, by means of a phase-locked loop. The accuracy on the symbol frequency may be smaller and, for example, reach 5% in unfavorable conditions. This accuracy is however sufficient to enable fast accurate determination by scanning of the band or using accurate algorithms. In all cases, the time gain provided by the present invention is very significant as compared to prior art.

An embodiment of a device 20' according to the present invention will now be described in relation with FIG. 6.

Figure 6:
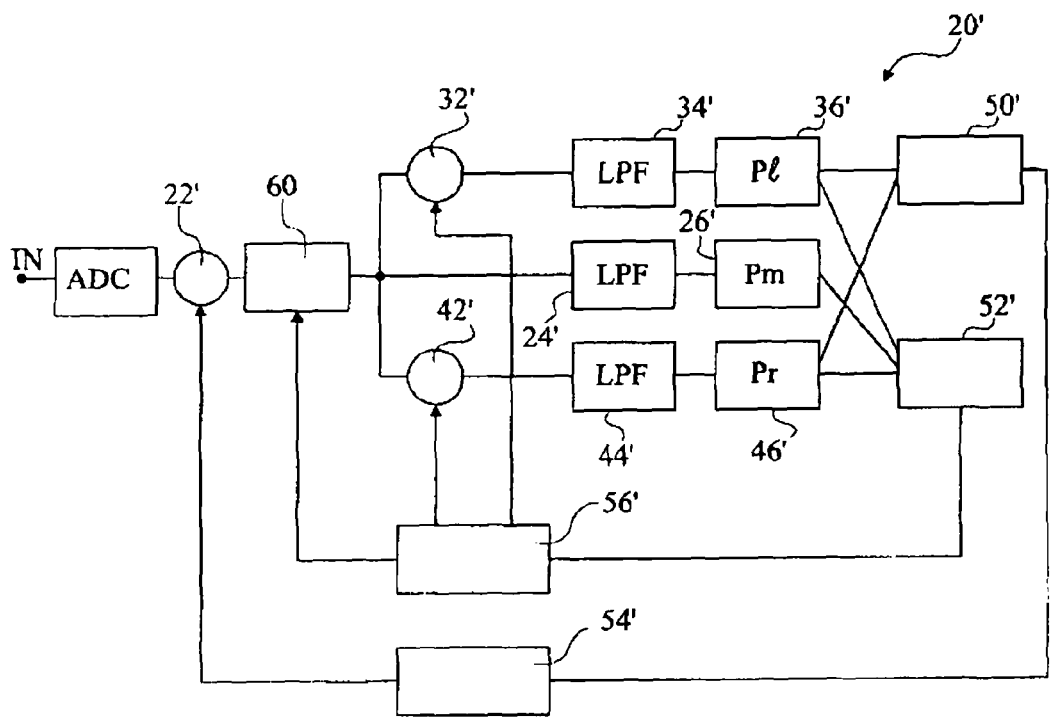

In FIG. 6, elements of same function as the elements of FIG. 5 bear the same reference number, topped with a <<'>>. These elements will not be explained again.

The difference between the structures of devices 20 and 20' is that device 20' comprises an additional element, unit 60. Unit 60 is a variable rate filter. Unit 60 changes the frequency of the samples provided by derotator 22' so that the frequency of the samples at the output of unit 60 is equal to four times frequency difference DF, that is, twice the frequency tested for the symbols.

The selection of frequency 4·DF for the samples at the output of unit 60 is advantageous. Indeed, derotators 32' and 42', which multiply the signal by a factor exp(jωt), must then multiply the signal either by +1, −1, j, or −j, which is very simply performed.

Further, in this case, low-pass filters 24', 34', and 44' have their attenuation contour automatically adjusted proportionally to the frequency tested for symbols, which may avoid separate adjustment.

It should further be noted that the fact of performing a portion of the processing at frequency 4·DF enables simplifying the circuits. Indeed, the elements downstream of filter 60 may be driven at a smaller frequency, typically equal to the frequency of the samples at the output of filter 60. In the circuit of FIG. 5, all the elements of the device are driven at the high sampling frequency of the analog-to-digital converter. Indeed, the sampling frequency of the analog-to-digital converter is generally comprised between 60 and 100 MHz, since it must be greater than or equal to twice the possible symbol frequency, that can reach 45 Mbauds.

Of course, the present invention is likely to have various alterations, modifications, and improvements which will readily occur to those skilled in the art.

Thus, in device 20, respectively 20', the low-pass filters are not necessarily identical. The same can be said for units 26, 36, and 46.

Also, units 50 (50') and 52 (52') may be of a structure different from what is written. It may for example be simple comparators comparing powers Pl and Pr on the one hand, and ratios (Pl+Pr)/Pm and α* on the other hand, circuits 54 and 56 (54', 56') being accordingly modified.

It should of course also be noted that devices 20 and 20' are examples only and that any device enabling implementation of the method according to the present invention belongs to the field of the present invention.

Thus, instead of using low-pass filters after a frequency change, band-pass filters centered on frequencies Fm, Fr, and F1, may be used, where the central frequency of these filters may be shifted.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for determining, in a signal, a value of the frequency of a carrier and a value of the frequency of symbols carried by said carrier comprising the steps of:
   a) determining a characteristic of the signal at or around a first, a second, and a third point of a band of the signal spectrum, the first point corresponding to a first frequency, the second point corresponding to a second frequency lower than the first frequency, and the third point corresponding to a third frequency greater than the first frequency;
   b) displacing the first, second, and third points separately so that said characteristic of the signal at the second point is equal to said characteristic of the signal at the third point and that the quotient of the sum of said characteristics of the signal at the second and third points and of said characteristic of the signal at the first point is equal to a determined ratio, wherein the first point is displaced by a different frequency from the second and third points according to a result of determining said characteristics of the signal; and c) selecting as a value of the carrier, the first frequency and, as a value of the symbol frequency, the difference between the third and the second frequency.

2. The method of claim 1, wherein said characteristic is the signal power.

3. The method of claim 1, wherein the difference between the first frequency and the second frequency is equal to the difference between the third frequency and the first frequency.

4. The method of claim 3, comprising the steps of:

4a) determining powers Pm, Pl, Pr of the signal in areas around the first, second, and third frequencies;

4b) if Pr is greater than Pl, increasing the first frequency by a predetermined quantity; and/or 4c) if ratio (Pr+Pl)/Pm is greater than a determined ratio, increasing the difference between the third and the second frequency.

5. The method of claim 1, wherein the difference between the third and the first frequency is selected to be initially equal to half the smallest possible frequency for the symbols.

6. The method of claim 1, wherein the determination of the signal characteristic is performed by calculating an average over several samples.

7. A device intended to determine, in a signal, a value of the frequency of a carrier and a value of the frequency of symbols carried by said carrier, comprising:

a) first frequency-changing means for transposing a first frequency of the signal to zero;

b) second frequency-changing means for transposing a second frequency of the signal to zero;

c) third frequency-changing means for transposing a third frequency of the signal to zero;

d) filtering means capable of receiving the signals originating from the first, second, and third frequency-changing means for providing a portion of the signal spectrum centered around the first, second, and third frequencies;

e) calculation means for calculating the power of the signals originating from the filtering means; and f) control means configured to control the frequency-changing means from the powers provided by the calculation means, wherein the control means comprise:

g) determination means for determining relations Kc·(Pl−Pr) and Kt·(Pl+Pr−α*Pm), Pm, Pl, Pr being the powers respectively corresponding to the first, second, and third frequencies, Kc and Kt being parameters, and α* a determined coefficient; and h) incrementation-decrementation means for separately shifting the frequencies transposed by the frequency-changing means, wherein the first frequency-changing means is shifted by a different frequency from the second and third frequency-changing means according to the result provided by the determination means.

8. The device of claim 7, wherein the first frequency-changing means is a derotator and wherein the second and third frequency-changing means are derotators coupled with the first derotator.

9. The device of claim 8, further comprising a variable-rate filter coupled between the output of the first derotator and the input of the second and third derotators.

10. A method for determining a frequency of a carrier of a signal and a frequency of symbols carried by the carrier, comprising:

determining a characteristic of the signal at first, second and third frequencies, the second frequency being lower than the first frequency and the third frequency being higher than the first frequency;

shifting the first, second and third frequencies separately such that the characteristic of the signal at the second frequency is equal to the characteristic of the signal at the third frequency and such that a ratio of the sum of the characteristics of the signal at the second and third frequencies to the characteristic of the signal at the first frequency is equal to a determined value, wherein the first frequency is shifted by a different frequency from the second and third frequencies according to a result of determining the characteristics of the signal; and selecting the first frequency as the frequency of the carrier and the difference between the second and third frequencies as the frequency of the symbols.

11. A method as defined in claim 1, wherein the characteristic is signal power.

12. A method as defined in claim 11, wherein the difference between the first and second frequencies is equal to the difference between the first and third frequencies.

13. A method as defined in claim 12, wherein determining a characteristic of the signal comprises determining first, second and third power values of the signal at the first, second and third frequencies, respectively, and wherein displacing the first, second and third frequencies comprises increasing the first frequency by a predetermined amount if the third power value is greater than the second power value.

14. A method as defined in claim 12, wherein determining a characteristic of the signal comprises determining first, second and third power values of the signal at the first, second and third frequencies, respectively, and wherein displacing the first, second and third frequencies comprises increasing the difference between the third and second frequencies if a ratio of the sum of the second and third power values to the first power value is greater than a predetermined ratio.

15. A method as defined in claim 11, wherein a difference between the third and first frequencies is selected to be initially equal to half the smallest possible frequency of the symbols.

16. A device to determine a frequency of a carrier of a signal and a frequency of symbols carried by the carrier, comprising:

a first frequency converter to convert a first frequency of the signal;

a second frequency converter to convert a second frequency of the signal;

a third frequency converter to convert a third frequency of the signal;

first, second and third filters responsive to signals produced by the first, second and third frequency converters, respectively, to provide portions of the signal spectrum centered around the first, second and third frequencies;

first, second and third calculation units to calculate the power of the signals produced by the first, second and third filters, respectively; and a controller to separately control the first, second and third frequency converters, wherein the first frequency converter is shifted by a different frequency from the second and third frequency converters based on the power values provided by the first, second and third calculation units so that the power of the signal at the second frequency is equal to the power of the signal at the third frequency and the ratio of the sum of the power values of the signal at the second and third frequencies to the power value of the signal at the first frequency is equal to a predetermined ratio.

17. A device as defined in claim 16, wherein the second and third frequency converters are coupled to an output of the first frequency converter.

18. A device as defined in claim 16, further comprising a variable rate filter coupled between an output of the first frequency converter and inputs of the second and third frequency converters.

* * * * *

UNITED STATES PATENT AND TRADEMARK OFFICE
CERTIFICATE OF CORRECTION

PATENT NO.        : 7,865,144 B2
APPLICATION NO.   : 11/213390
DATED             : January 4, 2011
INVENTOR(S)       : Jacques Meyer Page 1 of 1

It is certified that error appears in the above-identified patent and that said Letters Patent is hereby corrected as shown below:

In the Specifications:
Col. 3, line 37, should read:
the power corresponding to frequency Fr, and Pl the power Signed and Sealed this
Twenty-second Day of February, 2011

David J. Kappos
*Director of the United States Patent and Trademark Office*